US012800367B2

(12) United States Patent
Bouchard et al.

(10) Patent No.: US 12,800,367 B2
(45) Date of Patent: Nov. 17, 2026

(54) ULTRASONIC TRANSDUCER CARTRIDGE

(71) Applicant: Watts Regulator Co., North Andover, MA (US)

(72) Inventors: Peter P. Bouchard, Ayer, MA (US); Sean Alexander Scruggs, San Marcos, CA (US); Jonathan Naveh, Escondido, CA (US); Joseph Michael Burke, Deerfield, NH (US)

(73) Assignee: Watts Regulator Co., North Andover, MA (US)

( * ) Notice: Subject to any disclaimer, the term of this patent is extended or adjusted under 35 U.S.C. 154(b) by 260 days.

(21) Appl. No.: 18/762,935

(22) Filed: Jul. 3, 2024

(65) Prior Publication Data

US 2026/0009664 A1 Jan. 8, 2026

(51) Int. Cl.
*G01F 1/66* (2022.01)
*G01F 1/667* (2022.01)
*G01F 15/14* (2006.01)

(52) U.S. Cl.
CPC .............. *G01F 1/662* (2013.01); *G01F 1/667* (2013.01); *G01F 15/14* (2013.01)

(58) Field of Classification Search
None
See application file for complete search history.

(56) References Cited

U.S. PATENT DOCUMENTS 3,817,098 A * 6/1974 Brown .................... G01F 1/662 73/861.28
5,458,004 A 10/1995 Van Der Pol
5,717,145 A 2/1998 Yasuhara et al.
5,905,207 A 5/1999 Schalk
9,188,468 B2 * 11/2015 Rath ........................ G01F 1/662
9,297,680 B2 3/2016 Maruyama et al.
11,150,118 B2 10/2021 Gledhill, III et al.
11,415,442 B2 8/2022 Meimberg et al.
2015/0308870 A1 * 10/2015 Gottlieb .................. E21B 47/10 73/861.28

FOREIGN PATENT DOCUMENTS

AU 2022200336 B2 12/2022
EP 0152132 A1 8/1985
EP 3798583 B1 * 3/2023 ............... G01F 1/66

* cited by examiner

*Primary Examiner* — Peter J Macchiarolo
*Assistant Examiner* — Jermaine L Jenkins
(74) *Attorney, Agent, or Firm* — Day Pitney LLP; George Chaclas; Joseph P. Quinn

(57) ABSTRACT

A sensor cartridge assembly for coupling in a fluid network. The cartridge assembly includes a tubular body including a spoke extending radially inward and distally out of the tubular body, and a threaded hollow end formed on the spoke. The spoke forms a conduit extending from an intermediate point of the tubular body into the threaded hollow end. The cartridge assembly includes a sensor assembly including a sensor head and a sensor lead extending from the sensor head through the conduit. Further, the cartridge assembly includes a nut threaded to the threaded hollow end to form a chamber, the nut including a distal annular rim. The sensor head is retained in the chamber by the distal annular rim of the nut so that the conduit and, thereby the sensor lead, are sealed from fluid in the fluid network.

15 Claims, 11 Drawing Sheets

ULTRASONIC TRANSDUCER CARTRIDGE

FIELD OF THE DISCLOSURE

The subject disclosure relates ultrasonic flow meters for detecting the flow rate of a fluid, and more particular to fittings for housing a transducer for ultrasonic flow meters.

BACKGROUND

Ultrasonic flow meters have become integral in measuring the flow velocity or flow rate of liquids within conduits. Typically, paired transducers are strategically placed on the upstream and downstream sides of a conduit, for example as shown and described in U.S. Pat. No. 9,297,680 B2, filed Apr. 30, 2014, entitled ULTRASONIC FLOW METER HAVING DETERIORATION SUPPRESSION IN FLOW RATE ACCURACY, which is incorporated herein by reference. The emitted ultrasonic waves travel through the liquid, reflecting off the inner wall surface of the conduit, and are then captured by the opposing transducer. The time disparity in receiving these ultrasonic signals enables precise calculation of the liquid's flow characteristics.

Current ultrasonic flow sensor design has encountered a persistent challenge when attempting to position sensors centered within the flow path of a straight pipe. Existing designs often struggle to arrange transducers effectively while maintaining optimal signal transmission and reception.

Further, conventional sensor arrangements frequently involve holders or fixtures that may compromise the integrity of the conduit. The presence of mounting elements within the flow path adversely affects the accuracy of flow measurements and potentially causes damage to the system. Leakage concerns are particularly pronounced when attempting to integrate sensors within a straight pipe configuration. Existing designs may inadvertently compromise the structural integrity of the conduit or introduce weak points where leaks can occur. The challenge lies in finding a balance between securing the transducers in a manner that ensures accurate flow measurements and avoiding any compromise to the conduit's sealing properties.

SUMMARY

In view of the above, a need exists for an ultrasonic transducer assembly that can be quickly and easily assembled while providing reliable operation. The improved assembly properly positions the sensor heads in the desired locations while keeping other components dry.

The present disclosure is directed to a sensor cartridge assembly for coupling in a fluid network. The cartridge assembly has a tubular body including a spoke extending radially inward and distally out of the tubular body. The spoke forms a hollow end and a conduit extending from an intermediate point of the tubular body into the hollow end. A sensor assembly includes a sensor head and a sensor lead extending from the sensor head through the conduit. A retaining nut couples to the hollow end to form a chamber, wherein the sensor head is retained in the chamber so that the conduit and, thereby the sensor lead, are sealed from fluid in the fluid network.

The tubular body may include a proximal flange extending radially outward to assemble with the fluid network to prevent fluid flow into the conduit. In one embodiment, the sensor cartridge assembly further comprises a first O-ring compressed by the retaining nut for preventing fluid passing by the sensor head into the conduit and maintaining a dry environment in the chamber and a second O-ring settled in an annular groove on the tubular body to prevent fluid travel over into the conduit. Preferably, the tubular body includes at least one additional spoke extending radially inward and distally out of the tubular body to support the hollow end.

The subject technology is also directed to an ultrasonic transducer cartridge for measuring the flow rate of fluid including a tubular body that defines first and second openings. The tubular body also defines an interior forming a fluid passageway along a flow axis between the first and second opening. The tubular body has an encasing spoke extending radially inward and distally out of the tubular body. The encasing spoke defines a conduit. A sensor assembly includes a flow sensor with a cable for electrical communication. The sensor assembly is propped in the flow axis of the ultrasonic transducer from the tubular body by the encasing spoke, wherein the conduit of encasing spoke is configured for guiding the cable of the flow sensor from the sensor assembly to an external portion of the ultrasonic transducer without exposure to the fluid.

In one embodiment, the ultrasonic transducer cartridge has support spokes extending radially inward and distally out of the tubular body with the encasing spoke, the support spokes also maintaining a position of the sensor assembly. The tubular body can include a proximal flange extending radially outward and perpendicular from the tubular body. Preferably, the transducer cartridge has two tail pieces, an ultrasonic transducer body disposed between the two tail pieces, and a union nut having proximal threading and a lip. The proximal threading is configured for sealingly capturing the proximal flange between the ultrasonic transducer body, one of the two tail pieces and the lip. The sensor cartridge assembly may also have one or more pressure sensor and temperature sensors mounted in the ultrasonic transducer body partially within the fluid passageway. Two O-rings can be provided, one of which prevents fluid contacting the flow sensor to proliferate into the conduit, and the other O-ring settled in an annular groove on the tubular body to prevent fluid travel over the tubular body of the ultrasonic transducer cartridge.

The subject technology is also directed to an ultrasonic transducer assembly for measuring the flow rate of fluid including a housing forming a fluid passageway along a flow axis between a first and second opening. The housing has a main body through which the fluid passageway extends and a tail piece abutting the main body, wherein the fluid passageway also extends through the tail piece. A tubular cartridge mounts in the housing, the cartridge defining an interior shaped to enable fluid ingress and egress therethrough. The cartridge further defines a proximal flange wedged sealingly between the tail piece and the main body. A union nut joins the main body and the tail piece together for holding the tubular cartridge in place.

In one embodiment, the tubular cartridge has an encasing spoke extending radially inward and distally out of the tubular cartridge from an intermediate opening in the tubular cartridge to a hollow end, the encasing spoke defining a conduit from the intermediate opening to the hollow end. The tubular cartridge also includes a sensor assembly with a sensor head and a sensor lead connected to the sensor assembly, wherein the sensor head is mounted in the hollow end and the sensor lead extends from the sensor head through the conduit. The sensor cartridge assembly may include a first O-ring in the hollow end for prevent fluid contacting the sensor head and proliferating into the conduit of the encasing spoke and a second other O-ring settled in an annular groove in the tubular cartridge to prevent fluid travelling over the tubular cartridge, and as such, a dry chamber is formed around the tubular body in communication with the conduit, wherein the main body defines a feeder hole in communication with the dry chamber and the sensor lead passes through the feeder hole.

The sensor cartridge assembly can also be provided so that the housing has a second tail piece opposing the tail piece and abutting the main body with the fluid passageway also extending through the second tail piece. A second tubular cartridge mounts in the housing, the second tubular cartridge defining an interior shaped to enable fluid ingress and egress therethrough, the second tubular cartridge further defining a proximal flange wedged sealingly between the second tail piece and the main body. A second union nut joins the main body and the second tail piece together for fixing the second tubular cartridge in place so that a predetermined distance between the sensor assemblies is set.

BRIEF DESCRIPTION OF THE DRAWINGS

Various aspects of the present disclosure are discussed herein with reference to the accompanying Figures. It will be appreciated that for simplicity and clarity of illustration, elements shown in the drawings have not necessarily been drawn accurately or to scale. Further, where considered appropriate, reference numerals can be repeated among the drawings to indicate corresponding or analogous elements. For purposes of clarity, however, not every component can be labeled in every drawing. The Figures are provided for the purposes of illustration and explanation and are not intended as a definition of the limits of the disclosure.

DETAILED DESCRIPTION

Figure 1:
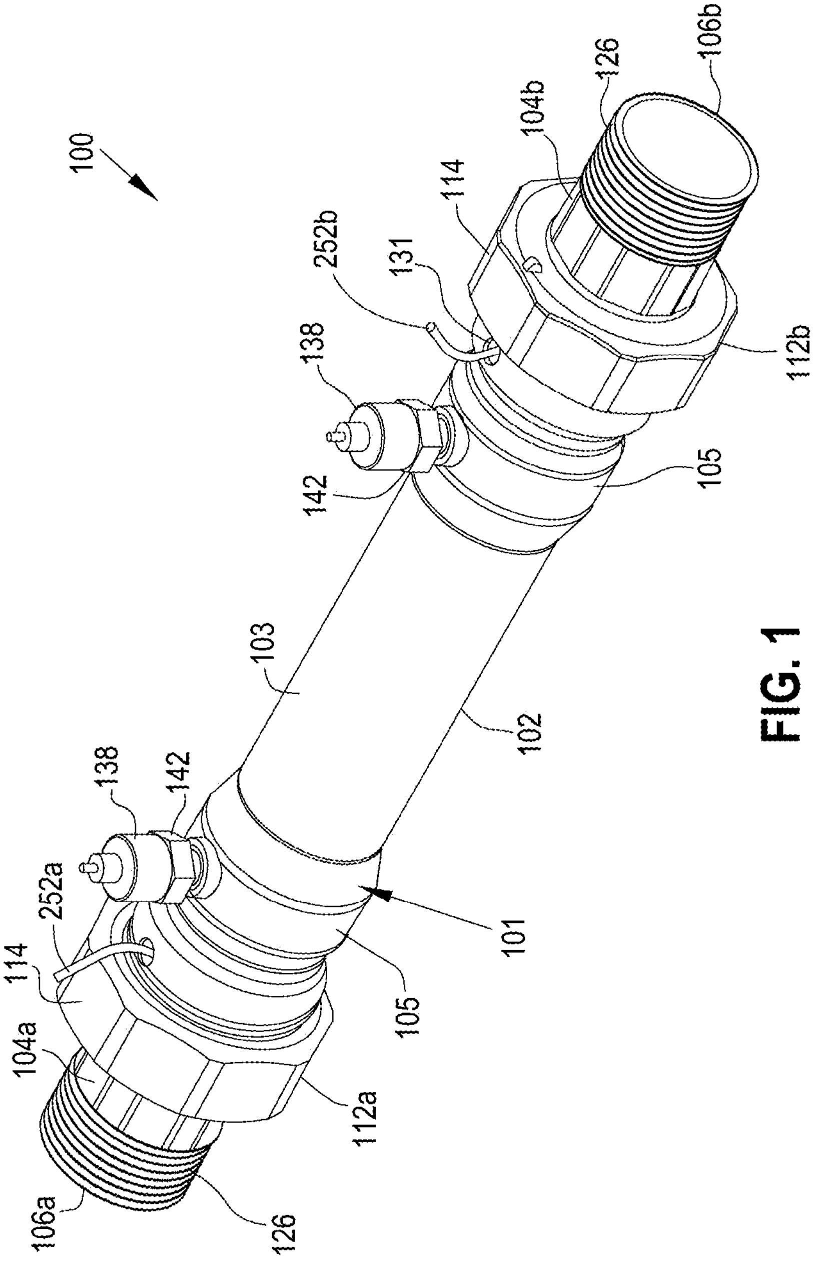
FIG. 1 shows a perspective view of an ultrasonic transducer cartridge for detecting the flow rate of a fluid in accordance with the subject technology.

The subject technology overcomes many of the prior art problems associated with ultrasonic transducers assemblies. The advantages, and other features of the technology disclosed herein, will become more readily apparent to those having ordinary skill in the art from the following detailed description of certain exemplary embodiments taken in combination with the drawings and wherein like reference numerals identify similar structural elements. It should be noted that directional indications such as vertical, horizontal, upward, downward, right, left and the like, are used with respect to the figures and not meant in a limiting manner.

Figure 2:
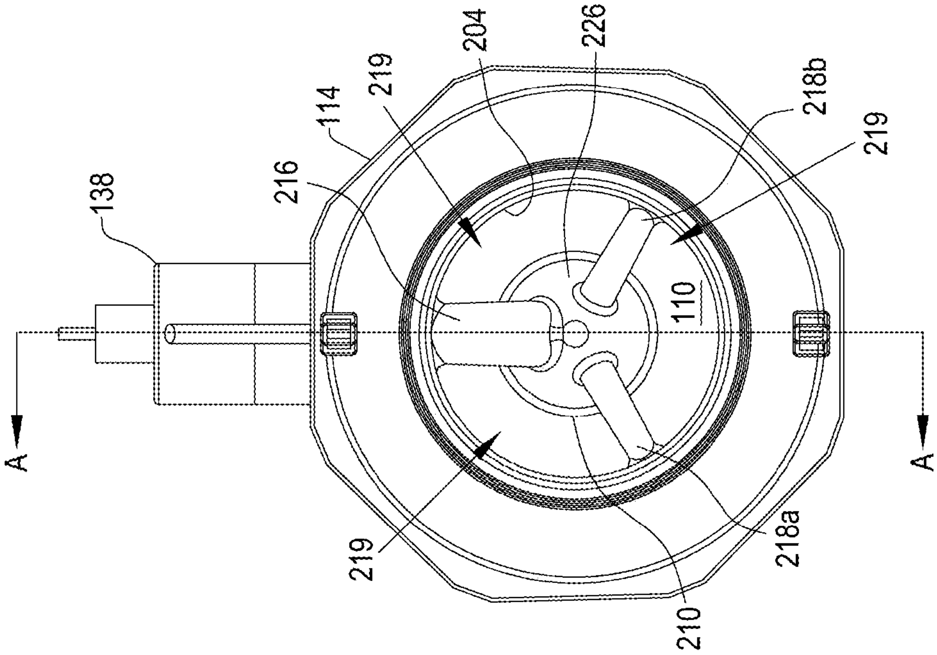
FIG. 2 shows an end, plan view of the ultrasonic transducer cartridge of FIG. 1 in accordance with the subject technology.

Referring now to FIGS. 1 and 2, perspective and end views of an ultrasonic flow meter assembly 100 are shown. Generally, ultrasonic flow meter assemblies have paired transducers or sensors that are arranged respectively on an upstream side and a downstream side of a conduit through which a liquid flows. Ultrasonic waves transmitted from one of the transducers or sensors are received by the other of the transducers, and a flow velocity or a flow rate of the liquid is measured based on a difference in propagation velocities of the ultrasonic waves. As such, a distance between the sensors is typically predetermined to produce accurate readings and preferably held steady.

The ultrasonic flow meter assembly 100 of the present application has housing 101 including a main body 102 interposed between two tail pieces 104*a*, 104*b*. A first tail piece 104*a*, defines an inlet 106*a* for connecting to a fluid network (not shown) and alternatively serving as an outlet. The second tail piece 104*b*, defines an outlet 106*b* also for connecting to the fluid network and alternatively functioning as an inlet. As shown, the inlet 106*a* and the outlet 106*b* are simply threaded to engage a traditional fitting. The terms inlet and outlet may be referred to herein simply as an opening due to the interchangeability thereof. It is envisioned that the inlet 106*a* and the outlet 106*b*, could be adapted (e.g., coupled to a nipple), reconfigured (e.g., changed from male to female and vice versa), and rearranged (e.g., oriented at an angle such as 90 degrees) for inclusion in any desired network. Together, the main body 102 and two tail pieces 104*a*, 104*b* form a conduit shape with cylindrical contour.

The main body 102 has a central narrower portion 103 with relatively larger end portions 105. The central narrower portion 103 of the main body 102 defines orifices 140 that receive demountable couplings 142 for sampling of the fluid in the main body 102 by probes 138. Each probe 138 may sense pressure, temperature or both. The main body 102 also defines two spaced apart feeder holes 131 in the relatively larger end portions 105. Each tailpiece 104 is coupled to the respective larger end portion 105 by a union nut 112.

Figure 3:
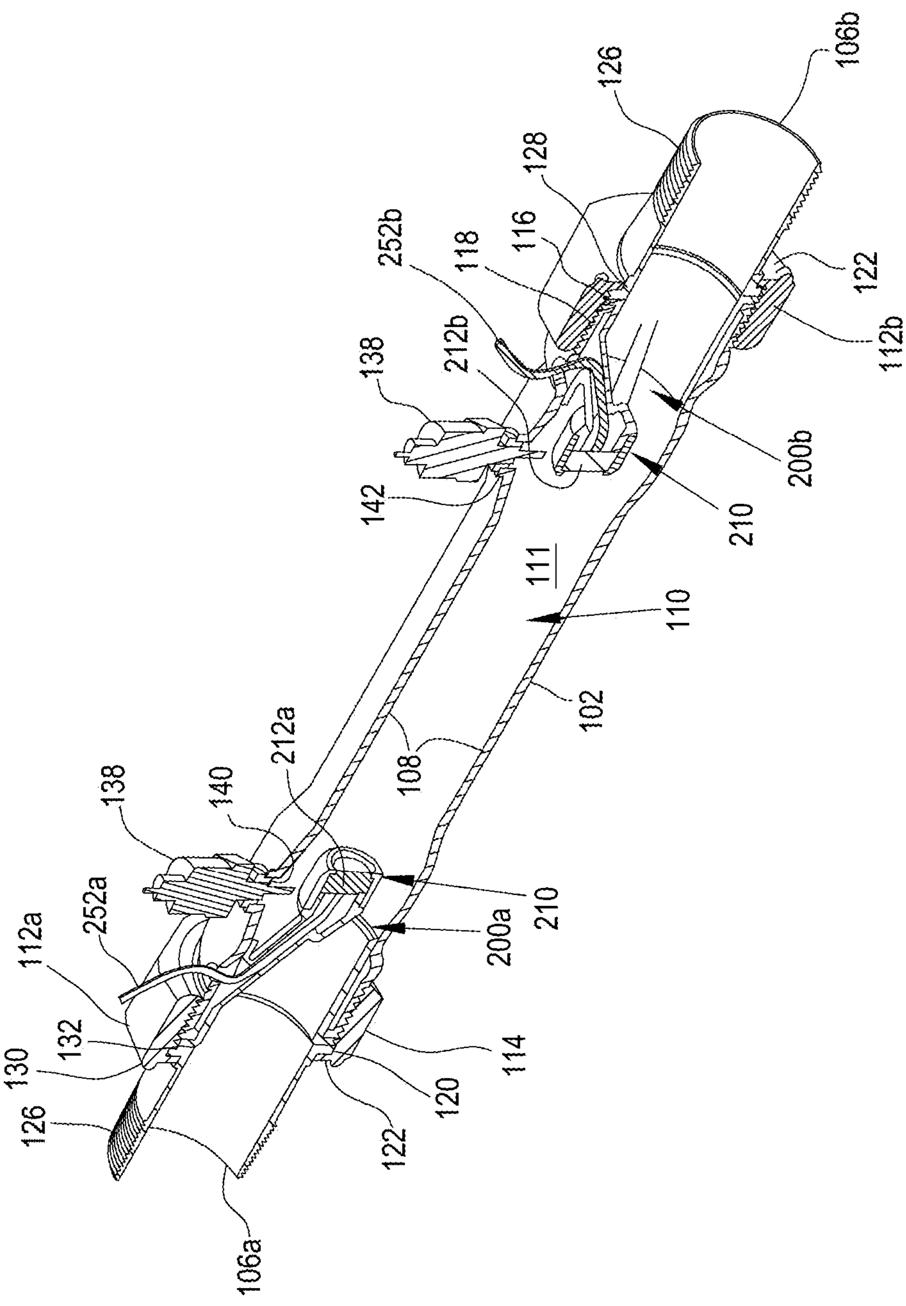
FIG. 3 shows a cross-sectional, perspective view of the ultrasonic transducer cartridge of FIG. 2 along cut line A-A in accordance with the subject technology.
Figure 4:
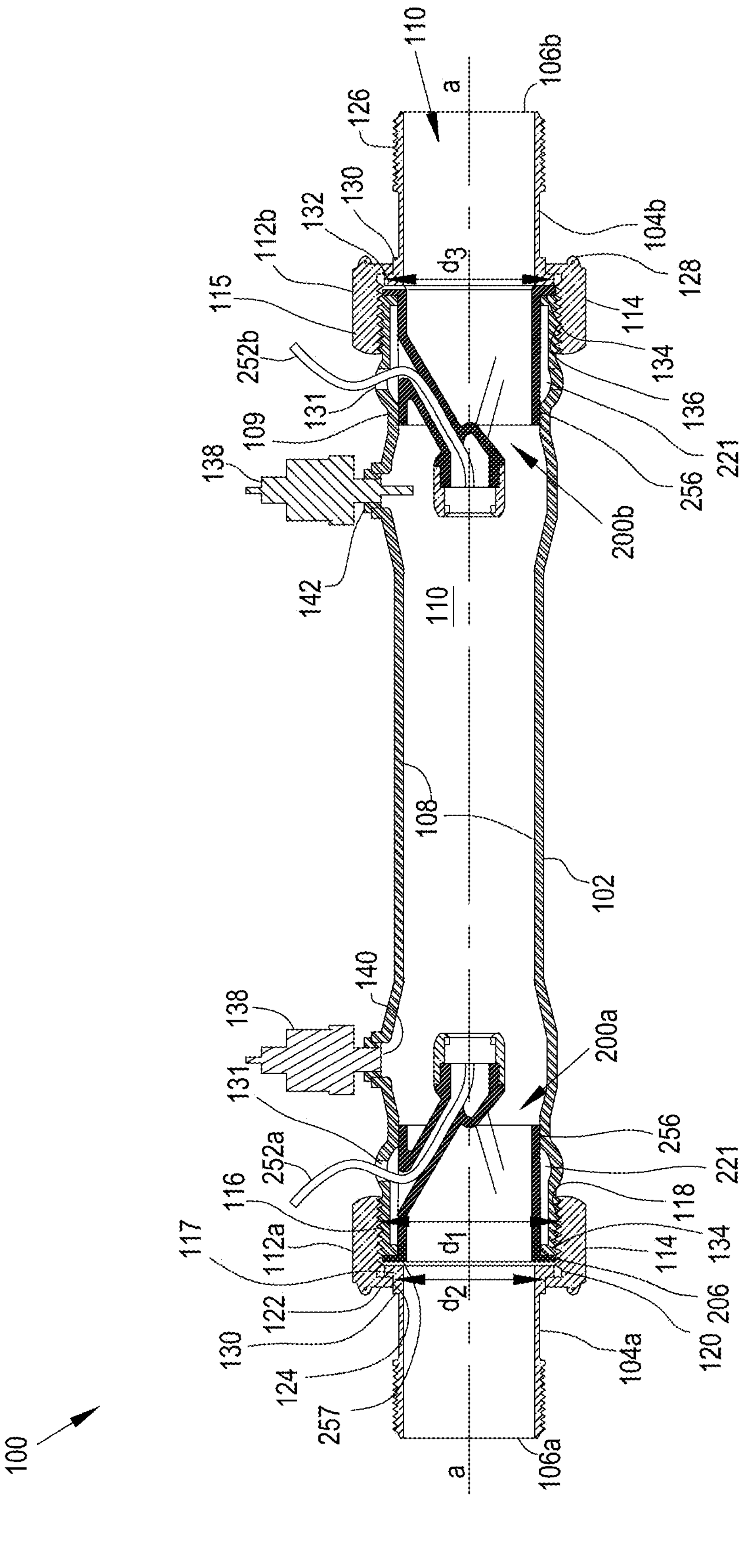
FIG. 4 shows a cross-sectional, plan view of the ultrasonic transducer cartridge of FIG. 2 along cut line A-A in accordance with the subject technology.

Referring now to FIGS. 3, 4 and 4A cross-sectional views of the ultrasonic flow meter assembly 100 are shown. The ultrasonic flow meter assembly 100 defines a fluid passageway 110 along a flow axis “a” between the inlet 106*a* and the outlet 106*b*. The main body 102 defines an interior 108 that is part of the fluid passageway 110. The larger portions 105 have a necked down seal point 109 and terminate with an inner rim 134.

Each tailpiece 104*a*, 104*b* has an exterior threaded portion 126 that abuts a pedestal portion 130. An end flange 117 extends outward from the pedestal portion 130. Each union nut 112 has a threaded end 115 extending from a shoulder 120. The shoulder 120 has an inner lip 122. The inner rim 134, the outer end flange 117 and the inner lip 122 are all approximately the same size. Two cartridges 200*a*, 200*b* are disposed in the fluid passageway 110 along the flow axis “a”, which will be described below. The main body 102, cartridges 200*a*, 200*b*, and tail pieces 104*a*, 104*b* are joined by the union nut 112 disposed therearound.

Figure 5:
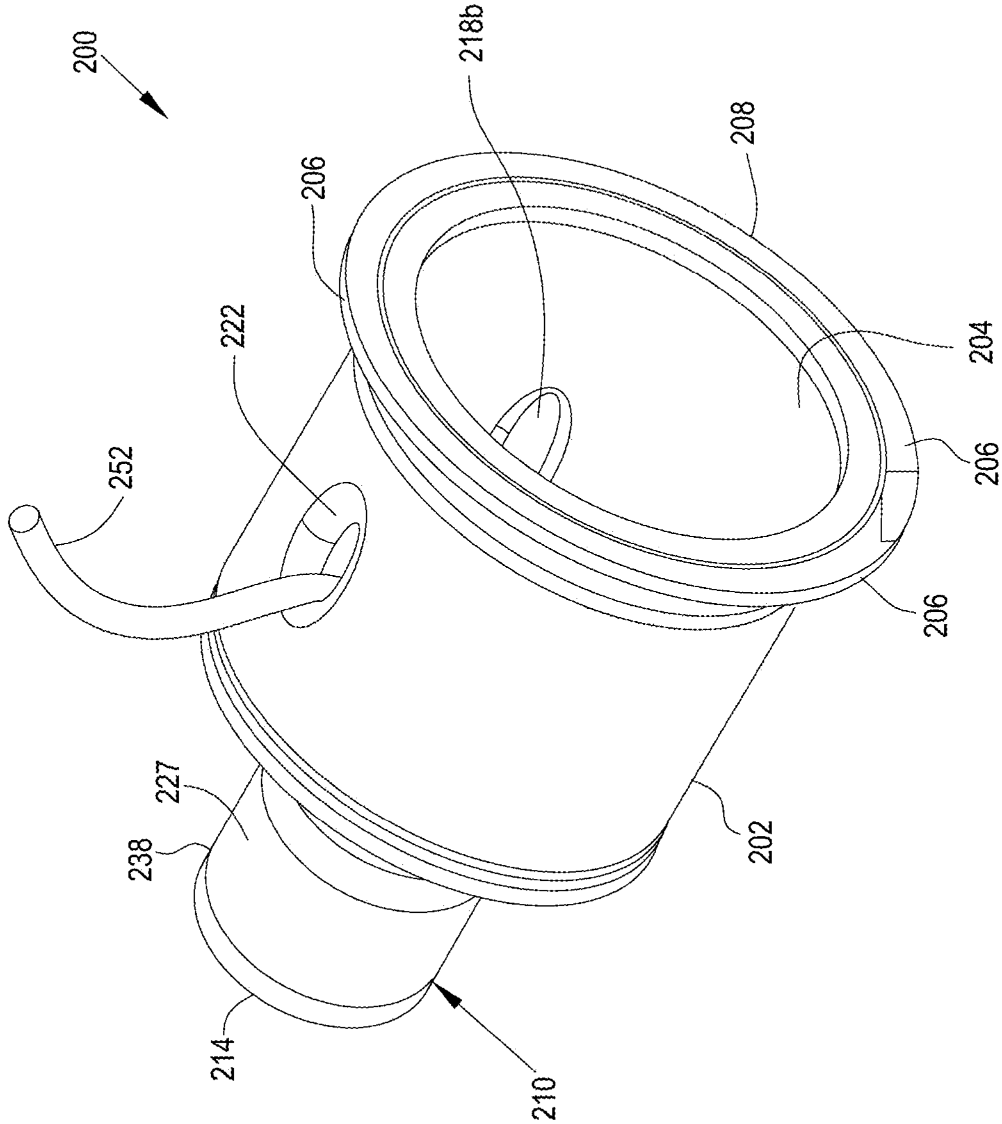
FIGS. 5 and 6 show the ultrasonic transducer cartridge in isolated perspective views in accordance with the subject technology.
Figure 6:
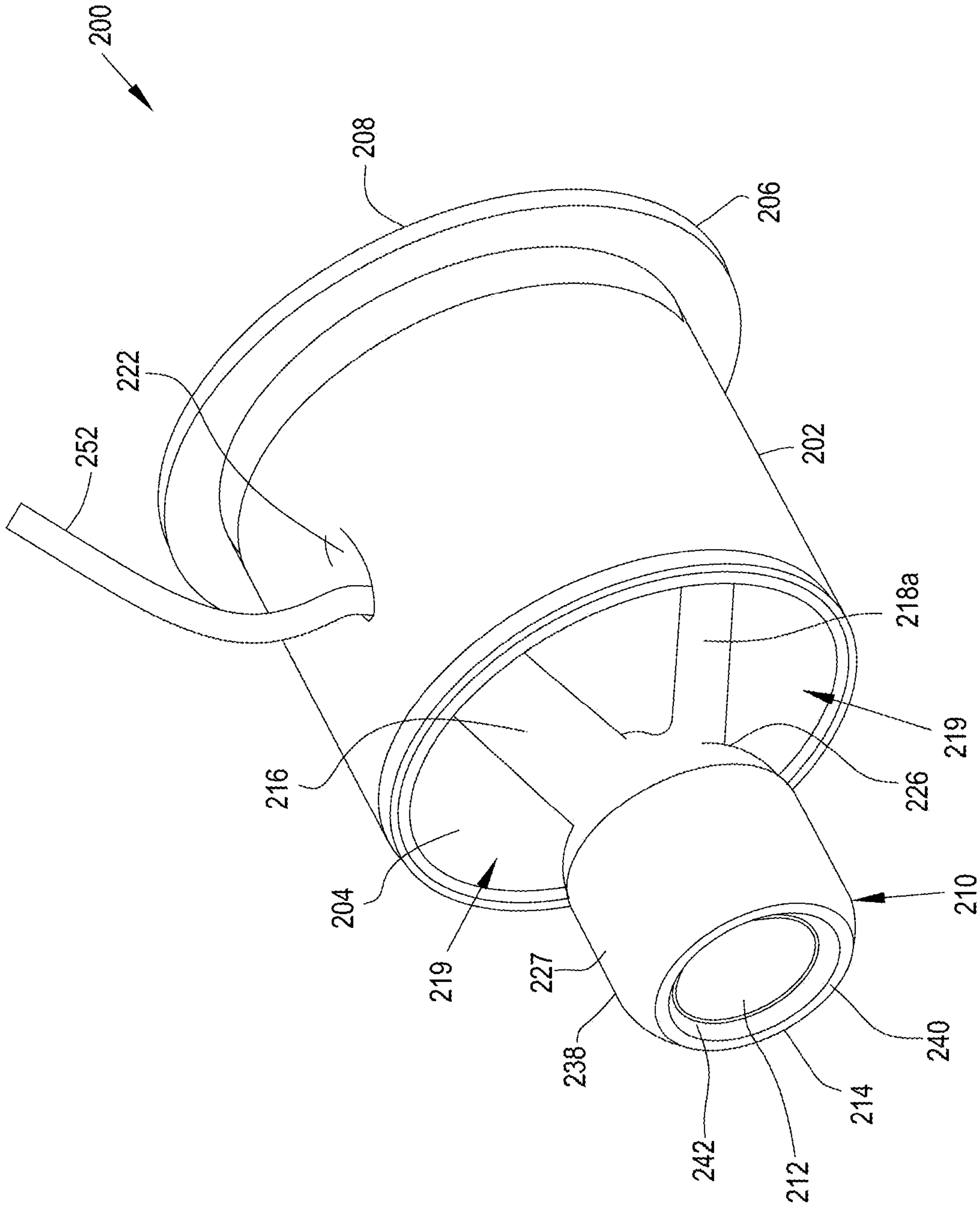
Figure 7:
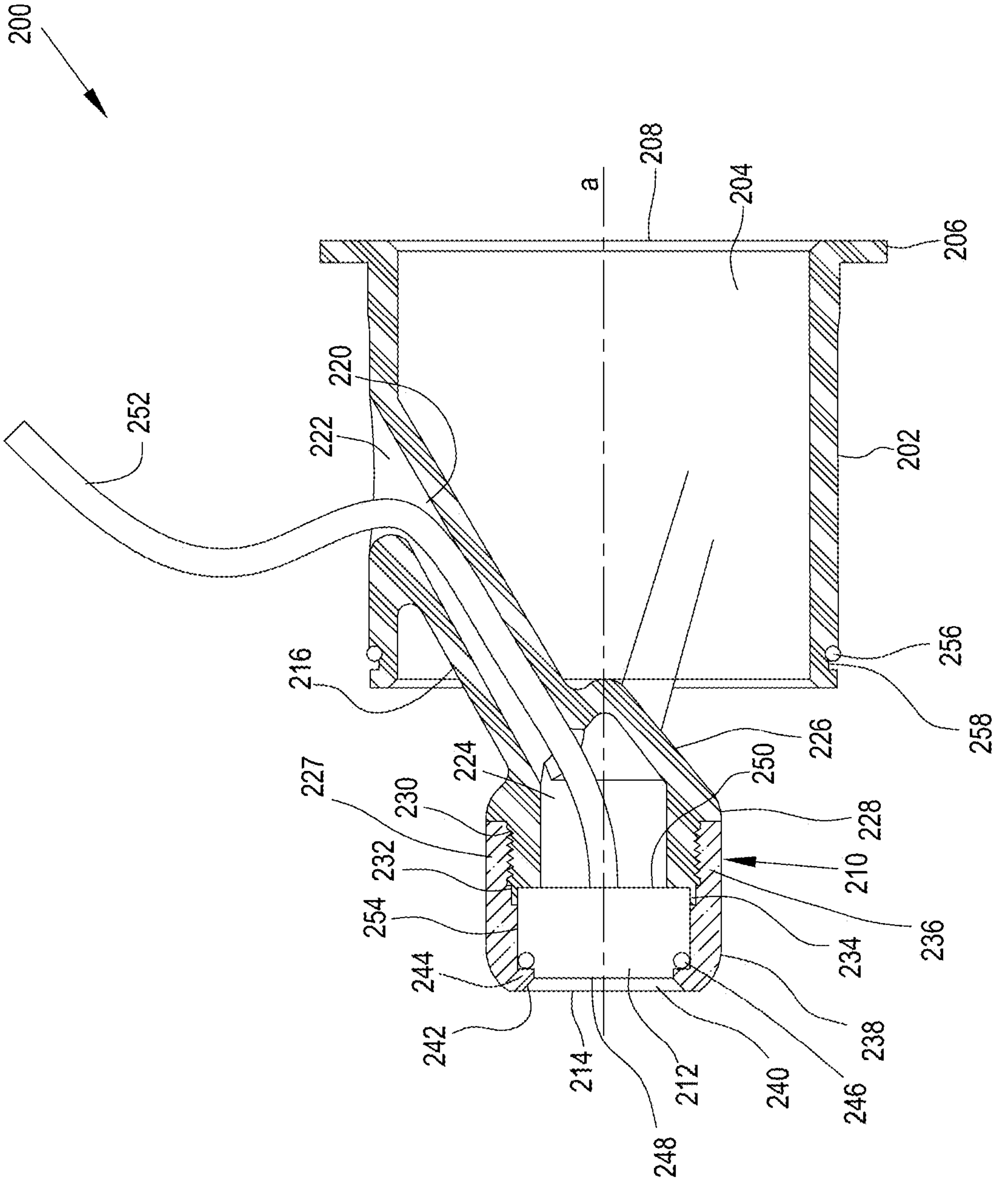
FIG. 7 shows the ultrasonic transducer cartridge in an isolated, cross-sectional, plan view in accordance with the subject technology.

Referring to FIGS. 5-7, perspective views of an isolated cartridge 200 are shown. The cartridge assembly 200 has a tubular body 202 that is cylindrical in contour, complimentary to the interior of a traditional conduit and defines an internal cavity 204 that forms part of the fluid passageway 110. The cartridge assembly 200 also defines a flange 206 extending radially outward and perpendicular from a first end 208 of the tubular body 202.

The cartridge assembly 200 also has a sensor assembly 210. The sensor assembly 210 includes a flow sensor head 212 and an electrical cable 252 extending from the sensor head 212. The sensor assembly 210 is centered in passageway 110 and propped from the internal cavity 204 of the cartridge assembly 200 by at least one encasing spoke 216 and support spokes 218*a*, 218*b*, extending out of the cavity 204.

The encasing spoke 216 and two support spokes 218*a*, 218*b* are disposed relatively equidistant from one another circumferentially within the internal cavity 204 (see FIG. 2), and extend from the internal cavity 204 of the cartridge assembly 200 in a central direction towards the second end 214 of the cartridge assembly 200, opposite from the first end 208. The encasing spoke 216 and two support spokes 218*a*, 218*b* coalesce in a hollow end 227 that houses the sensor assembly 210 situated along the flow axis "a". As best seen in FIG. 2, three arcuate slots 219 are formed between the spokes 216, 218 to allow flow around the hollow end 227.

The encasing spoke 216, as is particularly highlighted in FIG. 7, forms an internal conduit 220. The internal conduit 220 propagates from an intermediate opening point 222 of the tubular body 202 of the ultrasonic transducer cartridge 100, to a chamber 224 partially formed by the hollow end 227. The encasing spoke 216 and the sensor assembly 210 may be integrally formed, but are not shown as such. When integrally formed, sealing the conduit 220 from the fluid passageway 110 is structurally simpler.

In the embodiment shown in FIG. 7, the encasing spoke 216 propagates relatively linearly from the internal cavity 204 of the cartridge assembly 200. The internal conduit 220 thereafter transitions into the hollow end 227 that forms part of the chamber 224. The hollow end 227 of the encasing spoke 216 forms a shoulder 228 followed by a threaded end 230. The threaded end 230 terminates in a distal end 232.

A retaining nut 238 couples to the threaded end 230 helping to form the chamber 224. The retaining nut 238 defines an opening 240 to chamber. As a result, when the flow sensor head 212 is fixed in the chamber, a portion of the sensor head 212 is exposed to the fluid passageway 110. The electrical cable 252 extends from the sensor head 212 through the conduit 220 and out of the respective feeder hole 131 in the main body 102.

The retaining nut 238 has a radially inward rim 242 surrounding the opening 240 for fixing the sensor head 212 in the chamber 224 against the distal end 232 when a threaded end 236 of the retaining nut 238 couples to the other threaded end 230. Preferably, the sensor head 212 includes an annulus 244 that carries an O-ring 246 to prevent fluid from passing by the sensor head 212 and further into the chamber 224 and conduit 220. Preferably, a dry side 250 of the sensor 212 snuggly fits in the retaining nut 238.

The tubular body 202 of the cartridge 200 includes an O-ring 256 set in a groove 258 so that the O-ring 256 is compressed against the sealing point 109 of the main body 102 to prevent fluid from passing around the cartridge 200. As a result, the flow of the fluid passageway 110 goes through the arcuate slots 219 formed between the spokes 216, 218.

Referring to FIG. 4, at least one O-ring 257 is also compressed between the tubular body 202 and the tailpiece 104. More particularly, the flange 206 of the tubular body 202 of the cartridge 200 compresses two O-rings 257 against the flange 117 of the tailpiece 226. As such, a dry chamber 221 is formed around the tubular body 202 between the sealing point 109 and the flanges 117, 206. The feeder holes 131 and the conduit 220 are connected to the dry chamber 221.

In this configuration, the chamber 224, internal conduit 220 and dry chamber 221 remain dry, enabling the electrical cable 252 of the sensor 212 to reach an external connection of the ultrasonic transducer assembly 100. If further cabling is necessary, embodiments may include several encasing spokes or several cables within a single spoke. The support spokes 218*a*, 218*b*, in the alternative, do not have an internal conduit and serve to prop the sensor assembly 210 from the support of the internal cavity 204 of the cartridge assembly 200. With that said, one having ordinary skill in the art will appreciate that the cartridge may have several or no encasing spokes, and similarly, several or no support spokes.

Referring to FIGS. 3-7, to construct the ultrasonic transducer assembly 100, each cartridge 200 is pre-assembled by placing the sensor 212 in the sensor fitting 234 of the sensor assembly 210 and the respective cable 252 is fed through the internal conduit 220 of the encasing spoke 216 of the cartridge assembly 200. The O-ring 246 is set in the annulus 244 of the sensor head 212. The retaining nut 238 is subsequently rotated to tighten the threaded end 230 of the sensor assembly 210 with the threads 236 of the retaining nut 238, snugly capturing the sensor 212 and sealing by compression of the O-ring 246.

Each cartridge assembly 200 is then inserted into the main body 102, with the sensor head 212 of the sensor assembly 210 inserted first/facing inward. The cable 252 can further be fed through a cable emission intermediate point 144 in the main body 102. The cartridge assembly 200 is nearly fully inserted before the flange 206 abuts the inner rim 134 of the main body 102. Thus, axial location of each cartridge assembly 200 is predetermined and fixed with the sensor heads 212 facing each other. By setting the location of the sensor heads 212, a distance d between the sensor heads 212 is set for proper operation.

The union nuts 112 thread on to the main body 102 forcing the inner lips 122 of the tailpieces 104 inward so that the flange 117 of the tailpieces, the at least one O-ring 257, and flange 206 of the cartridge tubular body 202 are compressed together between the inner rim 134 of the main body 102 and the inner lips 122 (see FIG. 4A). The lips 122 of the union nuts 112 rest on a pedestal portion 130 of the tailpieces 104 to facilitate assembly. As preferred, a pressure sensor probe 138 and/or temperature sensor 138 are inserted partially within the fluid passageway 110 through the one or more orifices 140 and demountable couplings 142.

In operation, as best shown in FIG. 3, when liquid flows inside the fluid passageway 110, acoustic wave signals are transmitted, for example, from the first sensor head 212*a* situated in the first cartridge assembly 200*a*. The acoustic wave signals propagate inside the liquid while being reflected by the interior surface 111 of the main body 102, and are received by the second sensor head 212*b* situated in the second cartridge assembly 200*b*.

In a reverse scenario, acoustic wave signals are transmitted from the second detection sensor head 212*b* situated in the second cartridge assembly 200*b*. The acoustic wave signals propagate inside the liquid while being reflected by the interior surface 111 of the main body 102, and are received by the first detection sensor 212*a* situated in the first cartridge assembly 200*a*.

In addition, reception signals based on the acoustic wave signals, which are received by the detection sensor heads 212*a*, 212*b*, are output to a controller (not distinctly shown) through the cables 252*a*, 252*b*. A propagation time difference $\Delta T$ is calculated from the detection signals by the controller, not shown, based on a propagation time of the first versus second scenario. A velocity V, i.e., a flow rate, of the liquid is calculated from the propagation time difference $\Delta T$.

Figure 8:
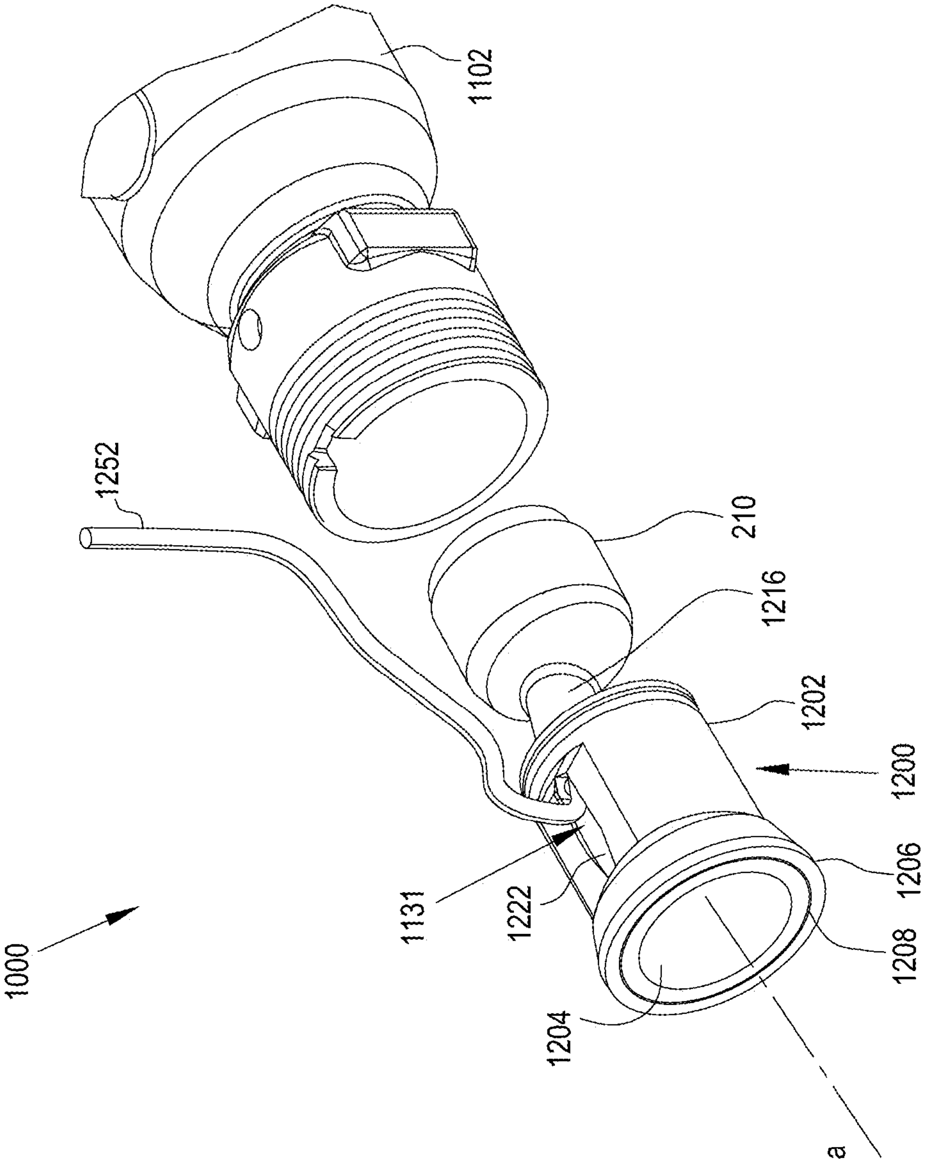
FIG. 8 shows a second embodiment of the ultrasonic transducer cartridge in a partially exploded, perspective view in accordance with the subject technology.
Figure 9:
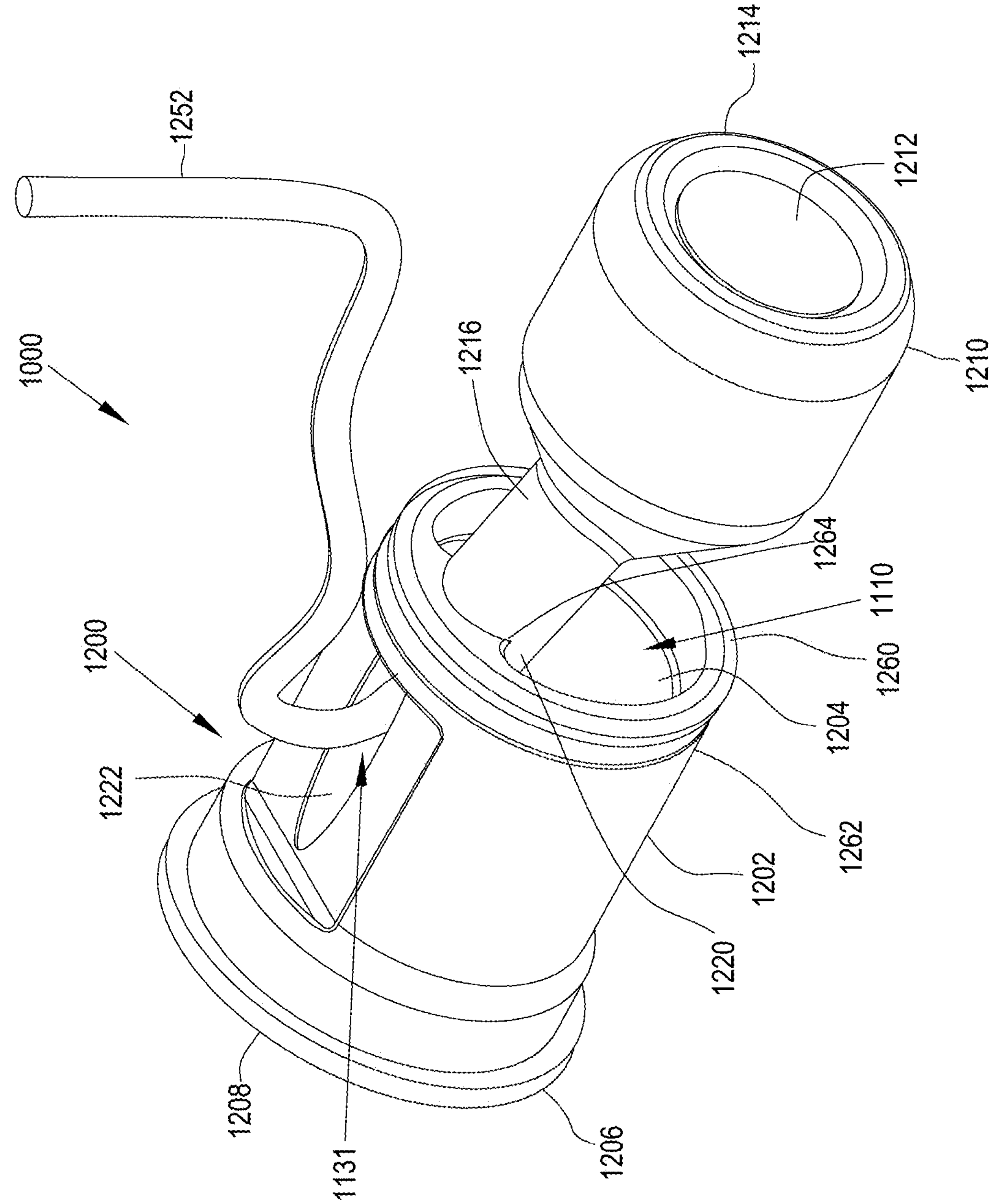
FIG. 9 shows the second embodiment of the ultrasonic transducer cartridge, particularly illustrating the ultrasonic transducer cartridge assembled in an isolated, perspective view in accordance with the subject technology.

Referring now to FIGS. 8 and 9, another embodiment of an ultrasonic transducer cartridge assembly 1000 is shown. Like numerals will be used to describe like elements of the 100 series labeling as in the 1000 series labeling. The ultrasonic transducer cartridge assembly 1000 uses a single encasing spoke 1216 and no support spokes. The cartridge 1200, as with the previously explained embodiment, has an exterior 1202 that is substantially cylindrical in contour, complimentary to the interior of a traditional conduit. Along with the proximal flange 1206 prolonging radially outward and perpendicular from the first end 1208 of the cylindrical exterior 1202, the cartridge 1200 still has a sensor assembly 1210 configured for containment of a flow sensor head 1212 disposed proximate to the second end 1214 of the cylindrical exterior 1202.

Differing in this embodiment, the sensor assembly 1210 is propped, via the single encasing spoke 1216, from the internal cavity 1204 of the cartridge 1200 and additionally supported by a band 1260 disposed on an edge 1262 of the cylindrical body 1202, opposite the proximal flange 1206. The encasing spoke 1216 prolongs in the direction of the second end 1214, opposite from the first end 1208 and proximal flange 1206, and is angled from the internal cavity 1204 and band 1260 to situate the sensor assembly 1210 along the flow axis “a”. As best seen in FIG. 9, the fluid passageway 1110 flows around the sensor assembly 1210 and through the tubular body 1202.

Because the encasing spoke 1216 depends from the band 1260 of the cartridge 1200, the encasing spoke 1216 divides partially at a convergence point 1264 to affix to the band 1260 while still providing a conduit 1220 in fluid communication from an intermediate point 1222 of egress to pass the cable 1252 through the feeder hole 1131 of the ultrasonic transducer cartridge assembly 1000. In this configuration, the chamber and conduit again remain dry enabling the cable 1252 of the sensor 1212 to reach an external of the ultrasonic transducer cartridge 1000 without fluid intervention.

Figure 10:
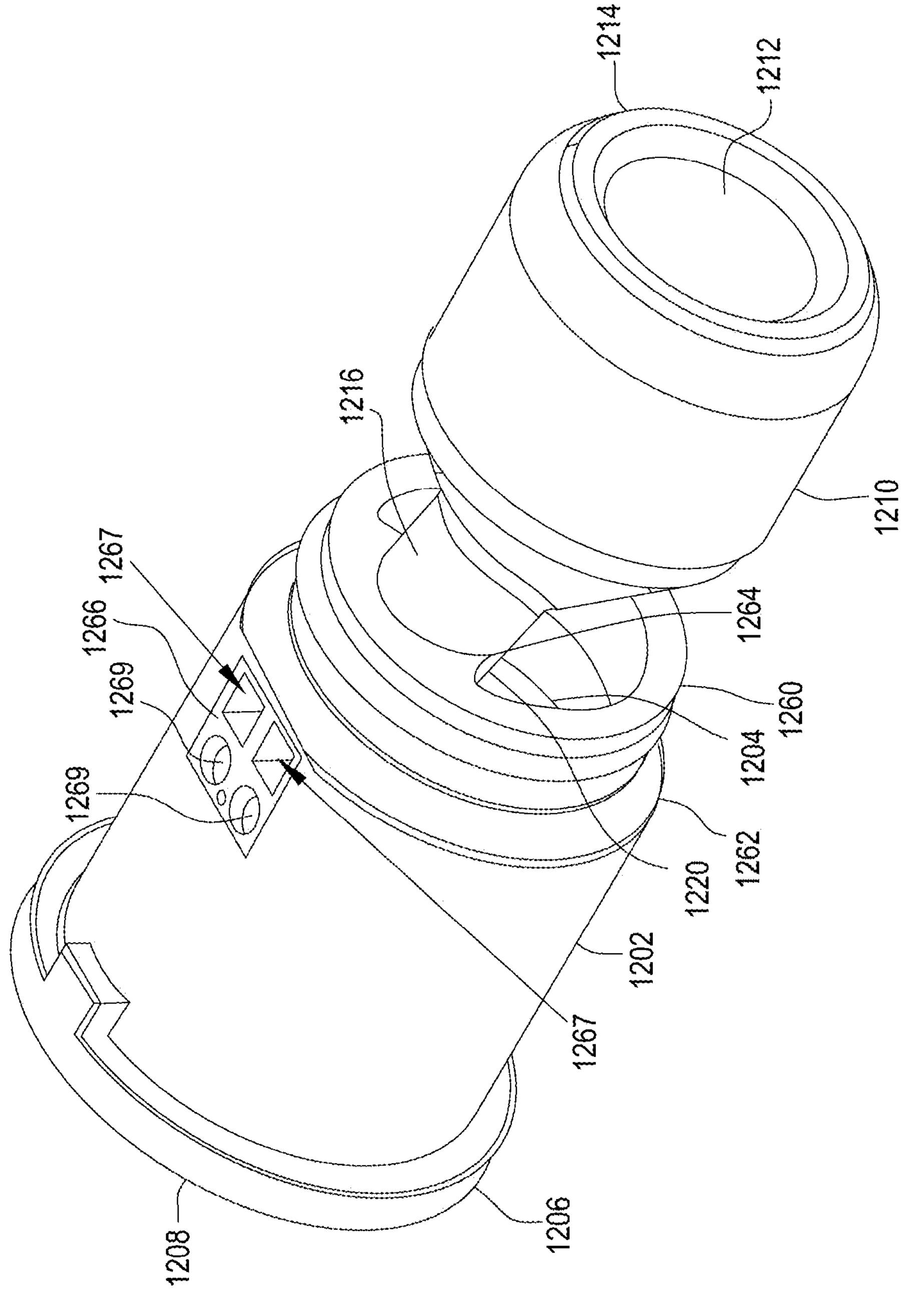
FIG. 10 shows a third embodiment of the ultrasonic transducer cartridge in an isolated, perspective view in accordance with the subject technology.

Referring now to FIG. 10, the cabling (not distinctly shown) propagates through the conduit of the encasing spoke 1216 from the sensor head 1212, and terminates as an electrical screw connector 1266. The connector 1266 may align with the feeder hole of the main body so that wires can simply be inserted into the capture hole 1267 and set in place by the associate screw 1269 to make the necessary electrical connections.

Figure 11:
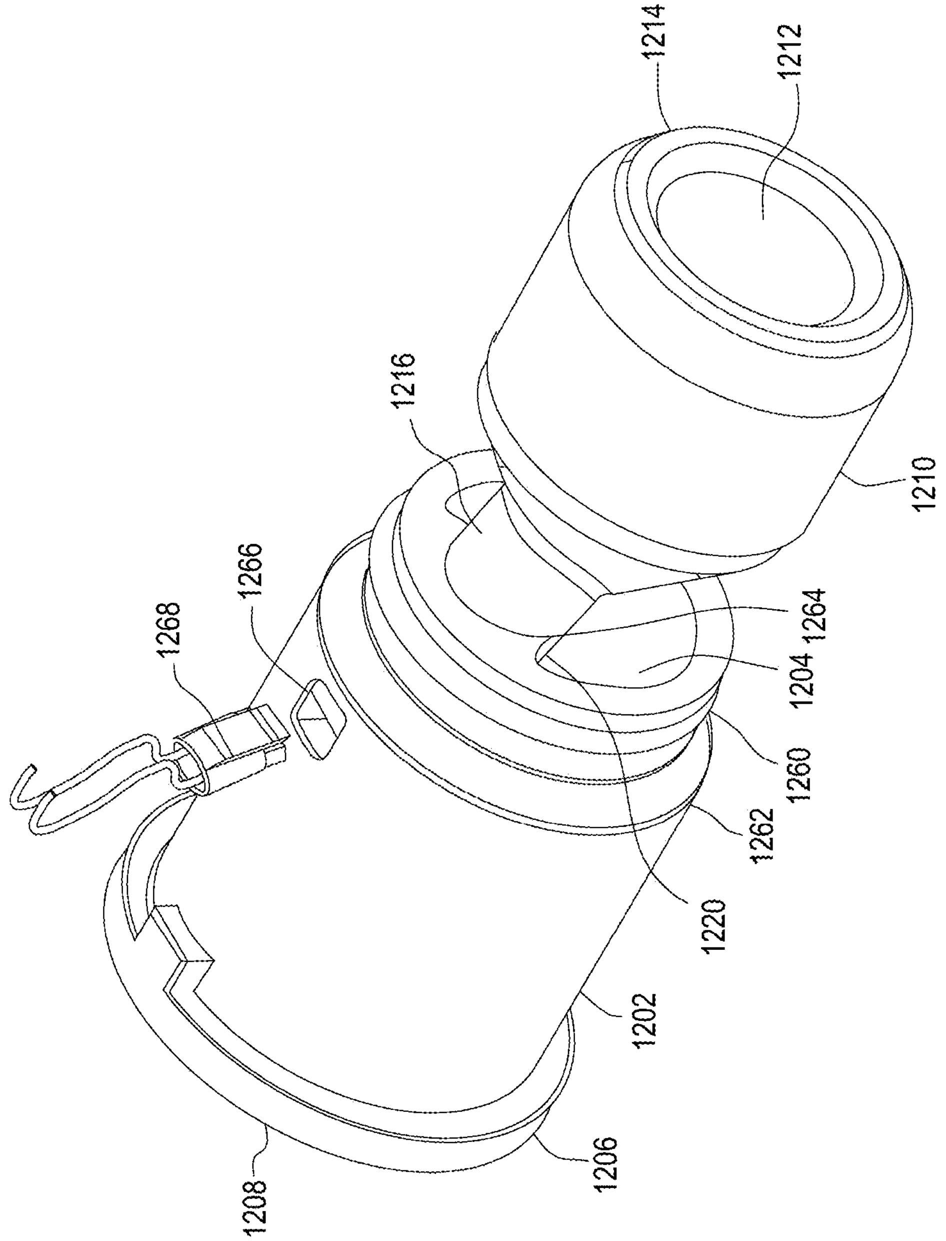
FIG. 11 shows a fourth embodiment of the ultrasonic transducer cartridge in an isolated, perspective view in accordance with the subject technology.

Referring now to FIG. 11, the cabling (not distinctly shown) from the sensor head 1212 terminates as an electrical socket connector 1266. As such, once the external connector 1268 is fed through, the connector 1268 may be quickly and easily inserted into the socket connector 1268 to make the electrical connection. In another embodiment, the sensor assembly operates wirelessly It will be appreciated by those of ordinary skill in the pertinent art that the functions of several elements can, in alternative embodiments, be carried out by fewer elements, or a single element. Similarly, in some embodiments, any functional element can perform fewer, or different, operations than those described with respect to the illustrated embodiment. Also, functional elements (e.g., check valves, valve elements, spring retention assemblies, and the like) shown as distinct for purposes of illustration can be incorporated within other functional elements in a particular embodiment.

While the subject technology has been described with respect to various embodiments, those skilled in the art will readily appreciate that various changes and/or modifications can be made to the subject technology without departing from the scope of the present disclosure.

What is claimed is:

1. A sensor cartridge assembly for coupling in a fluid network, the cartridge assembly comprising:
- a tubular body including a spoke extending radially inward and distally out of the tubular body, wherein the spoke forms a hollow end and a conduit extending from an intermediate point of the tubular body into the hollow end;
- a sensor assembly including a sensor head and an electrical cable extending from the sensor head through the conduit; and
- a retaining nut coupled to the hollow end to form a chamber, wherein the sensor head is retained in the chamber so that the conduit and, thereby the electrical cable, are sealed from fluid in the fluid network.

2. The sensor cartridge assembly of claim 1, wherein the tubular body includes a proximal flange extending radially outward to assemble with the fluid network to prevent fluid flow into the conduit.

3. The sensor cartridge assembly of claim 1, further comprising: a first O-ring compressed by the retaining nut for preventing fluid passing by the sensor head into the conduit and maintaining a dry environment in the chamber; and a second O-ring settled in an annular groove on the tubular body to prevent fluid travel over into the conduit.

4. The sensor cartridge assembly of claim 1, wherein the tubular body further comprising at least one support spoke extending radially inward and distally out of the tubular body to support the hollow end.

5. An ultrasonic transducer cartridge for measuring the flow rate of fluid comprising:
- a tubular body defining: a first opening; a second opening; and an interior forming a fluid passageway along a flow axis between the first and second opening, and the tubular body having an encasing spoke extending radially inward and distally out of the tubular body, the encasing spoke defining a conduit; and
- a sensor assembly includes a flow sensor with a cable for electrical communication, the sensor assembly propped in the flow axis of the ultrasonic transducer from the tubular body by the encasing spoke,
- wherein the conduit of encasing spoke is configured for guiding the cable of the flow sensor from the sensor assembly to an external portion of the ultrasonic transducer without exposure to the fluid.

6. The ultrasonic transducer cartridge of claim 5, further comprising support spokes extending radially inward and distally out of the tubular body with the encasing spoke, the support spokes also maintaining a position of the sensor assembly.

7. The ultrasonic transducer cartridge of claim 5, wherein the tubular body includes a proximal flange prolonging radially outward and perpendicular from the tubular body.

8. The ultrasonic transducer cartridge of claim 7, further comprising:

two tail pieces;

an ultrasonic transducer body disposed between the two tail pieces; and a union nut having proximal threading and a lip, the proximal threading configured for sealingly capturing the proximal flange between the ultrasonic transducer body, one of the two tail pieces and the lip.

9. The ultrasonic transducer cartridge of claim 8, further comprising a pressure sensor and temperature sensor mounted in the ultrasonic transducer body partially within the fluid passageway.

10. The ultrasonic transducer cartridge of claim 5, further comprising two O-rings, one of which prevents fluid contacting the flow sensor to proliferate into the conduit, the other O-ring settled in an annular groove on the tubular body to prevent fluid travel over the tubular body of the ultrasonic transducer cartridge.

11. An ultrasonic transducer assembly for measuring the flow rate of fluid comprising:

a housing forming a fluid passageway along a flow axis between a first and second opening and having:

a main body through which the fluid passageway extends; and a tail piece abutting the main body, the fluid passageway also extending through the tail piece;

a tubular cartridge mounted in the housing, the cartridge defining an interior shaped to enable fluid ingress and egress therethrough, the cartridge further defining a proximal flange wedged sealingly between the tail piece and the main body; and a union nut configured for joining the main body and the tail piece together for holding the tubular cartridge in place.

12. The ultrasonic transducer assembly of claim 11, wherein the tubular cartridge further comprises:

an encasing spoke extending radially inward and distally out of the tubular cartridge from an intermediate opening in the tubular cartridge to a hollow end, the encasing spoke defining a conduit from the intermediate opening to the hollow end; and a first sensor assembly including a sensor head and an electrical cable connected to the first sensor assembly, wherein the sensor head is mounted in the hollow end and the electrical cable extends from the sensor head through the conduit.

13. The ultrasonic transducer assembly of claim 12, further comprising:

a first O-ring in the hollow end for prevent fluid contacting the sensor head and proliferating into the conduit of the encasing spoke; and a second other O-ring settled in an annular groove in the tubular cartridge to prevent fluid travelling over the tubular cartridge, and as such, a dry chamber is formed around the tubular body in communication with the conduit, wherein the main body defines a feeder hole in communication with the dry chamber and the electrical cable passes through the feeder hole.

14. The ultrasonic transducer assembly of claim 12, wherein the housing has a second tail piece opposing the tail piece and abutting the main body, the fluid passageway also extending through the second tail piece, and further comprising: a second tubular cartridge mounted in the housing and having a second sensor assembly, the second tubular cartridge defining an interior shaped to enable fluid ingress and egress therethrough, the second tubular cartridge further defining a proximal flange wedged sealingly between the second tail piece and the main body; and a second union nut configured for joining the main body and the second tail piece together for fixing the second tubular cartridge in place so that a predetermined distance between the first and second sensor assemblies is set.

15. The ultrasonic transducer assembly of claim 11, further comprising a pressure sensor and temperature sensor disposed partially within the fluid passageway from the main body.

* * * * *